US006829973B1

(12) United States Patent
Yang

(10) Patent No.: US 6,829,973 B1
(45) Date of Patent: Dec. 14, 2004

(54) SAW BLADE WITH A PROJECTING FRACTURING MEMBER

(75) Inventor: Benjamin H Yang, Portland, OR (US)

(73) Assignee: Benjamin Hoching Pisano Yang, Portland, OR (US)

( * ) Notice: Subject to any disclaimer, the term of this patent is extended or adjusted under 35 U.S.C. 154(b) by 14 days.

(21) Appl. No.: 10/615,162

(22) Filed: Jul. 8, 2003

(51) Int. Cl.[7] ......................... B23D 47/00; B23D 49/00; B26D 9/02

(52) U.S. Cl. ............................. 83/835; 83/850; 30/355; 30/166.3

(58) Field of Search .................. 83/835, 661, 846–855, 83/665, 833, 834; 30/355, 166.3, 501, 504, 505

(56) References Cited

U.S. PATENT DOCUMENTS 1,672,893 A * 6/1928 Kurtz .......................... 299/27
1,929,838 A * 10/1933 Crane .......................... 30/355
2,916,066 A * 12/1959 Morse ....................... 30/166.3
4,133,239 A * 1/1979 Goldblatt ..................... 83/834
4,562,761 A * 1/1986 Alexander ................... 83/830
5,042,350 A * 8/1991 Nitschmann ............. 83/522.11
5,448,833 A * 9/1995 Coon .......................... 30/142

* cited by examiner

*Primary Examiner*—Boyer D. Ashley
(74) *Attorney, Agent, or Firm*—Mark Olsen

(57) ABSTRACT

A saw blade, such as a snow saw blade, for cutting heterogeneous, friable materials that includes a fracturing member positioned in the extending line of cutting teeth of the blade, the fracturing member providing a non-cutting impact surface projecting outwardly beyond the outermost line of the cutting teeth to momentarily interrupt cutting engagement during sawing of a surface with a non-cutting, impacting engagement therewith to shatter and break the surface as it is being cut for a more effective sawing operation of the cutting teeth.

6 Claims, 5 Drawing Sheets

1'
3
1
1"
4
5" 5 5' 5" 4
4'
6
2

SAW BLADE WITH A PROJECTING FRACTURING MEMBER

BACKGROUND

Field of the Invention

This invention relates to saw blade configurations, and more particularly to a saw blade having a raised, non-cutting, fracturing member amongst or adjacent to the saw teeth to facilitate the cutting and raking actions of the saw blade through friable, heterogeneous materials such as soft snow mixed with denser layers of compacted snow and ice.

In the field of avalanche safety research and practice, a snow saw is a vital tool. Snow must be cut cleanly and evenly for the purpose of determining slope stability and snowfall history, Outdoor recreationalists also use saws to build snow caves, igloos, sculptures, emergency shelters, and ski jumps. For these purposes a carpenter saw, timber saw, agricultural saw and machete-like tool have been used. More recently, lightweight, portable hand saws designed solely for the purpose of cutting snow have become available for both recreational and professional use.

Snow is an extremely heterogeneous, crystalline material. There are many factors that effect the snow pack vertical profile, such as number of snowfall events and amount of snow which is deposited with each event. The temperature, wind, humidity and time between events also play a critical role in the development of a various layers can be light and fluffy, solid ice, or anything between these two extremes. If the surface of fresh snow is melted by elevated temperatures, rain, and/or freezing rain and then refrozen or packed hard by a strong wind, it can become much more dense and hard than the snow below it. Subsequent snow deposition events can bury the hard layer within the snow pack. In either case, when the saw encounters this hard icy layer, the teeth of the saw can ride, slip, or skate over the edge of the icy layer, slowing or ceasing the forward cutting progress of the saw. Continued sawing on a hard layer may eventually generate enough friction to melt the ice, but unless the obstructing layer is shattered, the saw will cut more slowly or not at all.

Unlike metal and wood saws, the teeth of which are designed to cut, shave and remove small pieces from the work-piece, snow saws function by shattering the friable crystalline structure of the snow and pushing it out of the way or removing it entirely from the kerf. A layer that is too hard for the teeth to shatter can slow or entirely stop the forward cutting progress of the saw.

The newest generation of snow saws have various tooth designs that address the challenges of cutting heterogeneous snow, namely, widely spaced teeth with relatively dull edges for safety. They are designed to cut and remove the maximum amount of material with the least amount of work and danger to the operator. The object of this invention is to provide a projecting, non-cutting, fracturing member amongst or adjacent to the cutting saw teeth to facilitate the cutting and raking actions of the saw blade through any friable, heterogeneous material. These materials include snow mixed with denser layers of compacted snow and ice, and may also include, but are not limited to, construction materials such as fiber reinforced foam and insulating foam with a stucco exterior.

SUMMARY

In its basic concept, this invention provides a saw blade having a projecting, non-cutting, fracturing member or a plurality of projecting, fracturing members interrupting the extending line of cutting saw teeth of the blade, to impact upon obstructions in a heterogeneous work piece as the blade saws through the material. The purpose of the fracturing member is to momentarily interrupt sawing engagement of the cutting saw teeth with an impacting contact against the surface being cut in order to fracture, shatter, roughen and break-up obstructions in the material to increase the ability of the cutting teeth of the saw blade to make forward cutting progress, thereby facilitating the sawing process.

OBJECTS AND ADVANTAGES

Accordingly, several objects and advantages of this invention are:

- To provide a saw blade that will saw more quickly and with less force through various heterogeneous materials including but not limited to snow.
- To provide a saw blade that will saw more quickly and with less force through heterogeneous materials comprised of softer less dense matrix mixed with harder friable, fibrous, and/or fragile layers.
- To provide a saw blade that can be used in various forms of saws such as linear, circular, reciprocating, continuous band and orbital.

DRAWING FIGURES

Figure 7A:
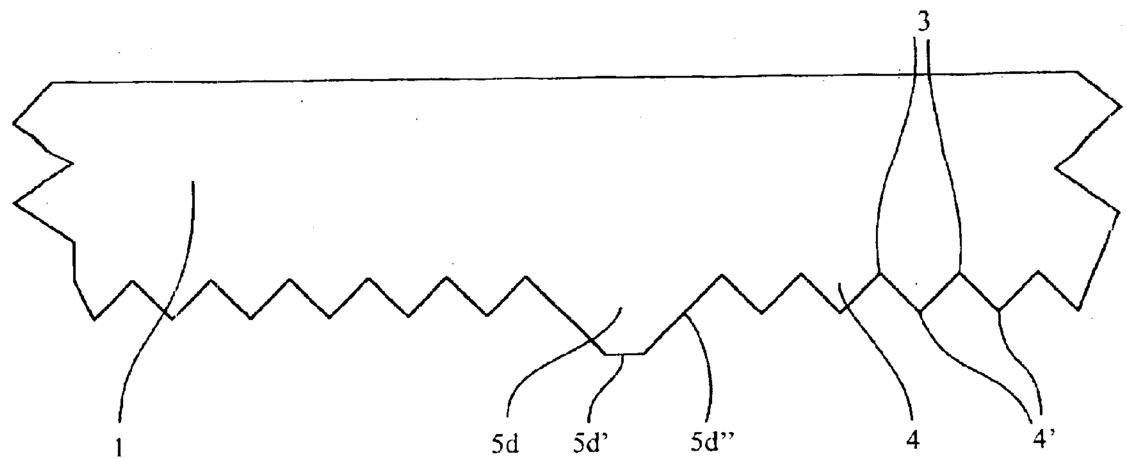
Figure 7B:
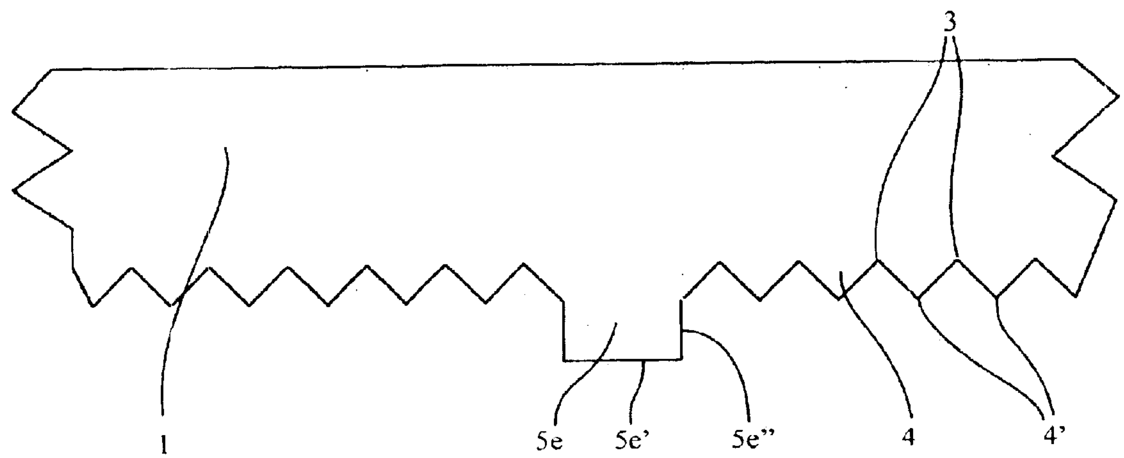
Figure 7C:
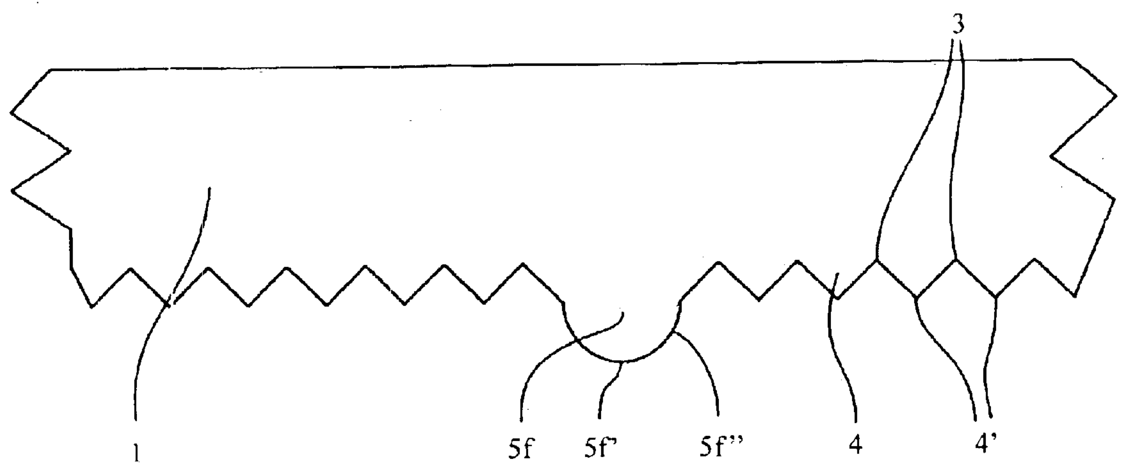

FIGS. 7*a–c* are fragmentary side elevations of saw blades showing still other different, alternative fracturing member configurations.

DESCRIPTION OF THE PREFERRED EMBODIMENTS

Figure 1:
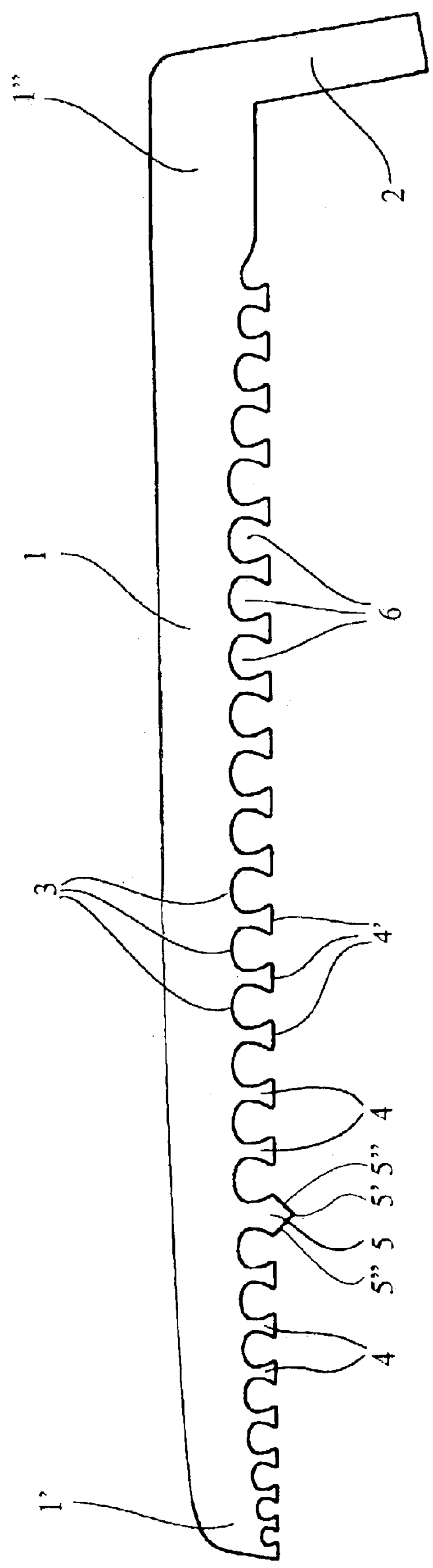
FIG. 1 is a side elevation of a preferred embodiment of a snow saw blade with a projecting fracturing member.

FIG. 1 shows a side view of one embodiment of the invention as applied on a hand saw blade that is intended to cut compacted snow. As shown, the hand saw comprises a longitudinally elongated flat blade body 1 having a selected thickness dimension, the blade body terminating in opposite front 1' and rear 1" longitudinal ends, and having a handle 2 associated with the rear end. One longitudinal edge of the blade body 1 forms an outer leading blade base edge 3 having a plurality of outwardly projecting cutting saw teeth 4 extending therealong the cutting saw teeth having a predetermined configuration and an outermost projecting terminal end 4' defining a predetermined tooth height between the leading base edge 3 and outermost terminal ends 4'.

The saw blade of this invention provides at least one outwardly projecting fracturing member 5*a*–5*f* on the outer leading base edge 3 of the blade that interrupts and extends beyond the line of the outermost projecting edges of the cutting saw teeth, as illustrated in the various drawing figures herein. As will be understood, a fracturing member 5 according to the present invention projects outwardly from the leading base edge 3 to an outermost terminal end 5' defining an overall fracturing member height that is greater than the height of the cutting saw teeth 4 of the blade, the fracturing member configured with at least one non-cutting impact surface 5" extending outwardly beyond the line of the overall height of the terminal ends of the cutting teeth, the impact surface oriented to correspond with the working direction or directions of the saw blade in operation.

Figure 2:
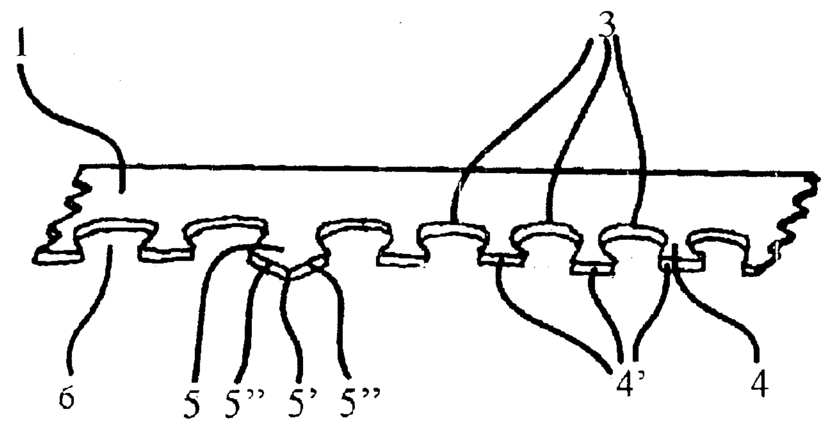
FIG. 2 is a fragmentary perspective view of the same saw blade shown in FIG. 1.
Figure 3:
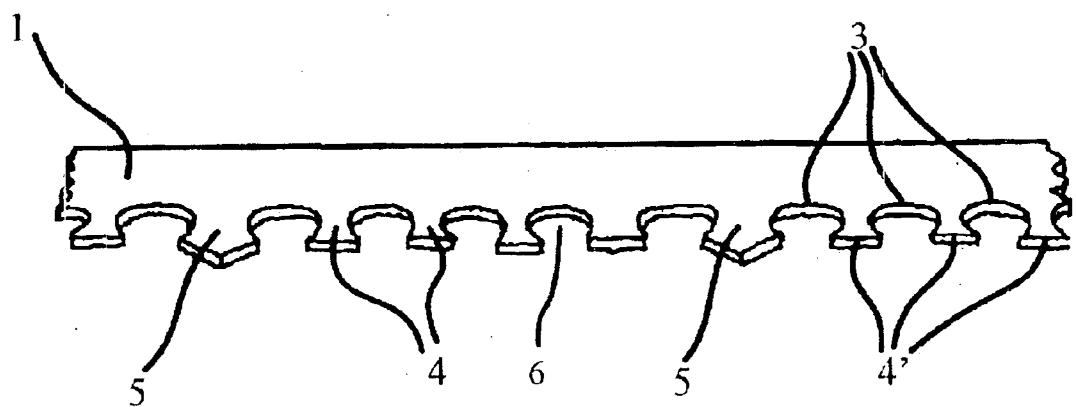
FIG. 3 is a fragmentary perspective view of a snow saw blade similar to FIG. 1 but having a plurality of fracturing members placed among the cutting teeth of the saw.

While the preferred overall height of the fracturing member 5 shown in the particular saw blade embodied in FIGS. 1–3 of the invention is 1.4 times the overall height of the associated cutting teeth 4, a fracturing member may have an overall height from 1.2 to 4 times the overall height of its associated cutting teeth as may be needed or desired for operation of a saw blade with different heterogeneous, friable materials.

FIGS. 1 and 2 depict the preferred embodiment of this fracturing member as employed on a snow-cutting hand saw. It is a hand saw with a handle 2 at one end 1". The projecting fracturing member 5 is positioned in the distal mid-section of a saw blade, in the area that experiences the most blade wear and where it would most likely encounter harder heterogeneities. The projecting fracturing member is symmetrical and functions to disrupt icy heterogeneities as the saw travels in both forward and backwards directions. It works as a push and a pull saw. The saw blade itself could be made out of wood, plastic, various metal and metal alloys or composite materials and the fracturing member may or may not be made out of the same material as the saw. The Cutting Teeth 4 are designed to cut and remove the material being sawed, and may be configured as needed or desired for the various materials to be cut. The accompanying, non-projection cutting teeth 4 are devised to cut the material and to rake the kerf clear of snow and ice. Oversized, cavernous gullets 6 are employed to efficiently remove material from the kerf.

Since the projecting fracturing member 5 is employed to dislodge material, and the Cutting Teeth 4 are employed to remove the debris, there exists a proportional relationship between these saw features. A projecting fracturing member that is outside of the aforementioned height range will render a saw blade a less efficient cutting tool. If the projecting fracturing member's height is too great, it tends to either jam on any heterogeneous layers and interfere with smooth blade operation and/or dislodge material faster than can be removed by the cutting teeth 4. If the height of a fracturing member is too little, it clearly cannot provide an effective impact surface projecting above the line of the cutting teeth.

In operation, the snow saw blade of FIGS. 1 and 2 is grasped in the hand by the handle 2 and reciprocally operated in the same manner as other hand saws. The reciprocating action of the blade cuts through compacted snow in both directions or saw travel leaving a clean kerf. When a harder heterogeneity such as ice or highly compacted snow is encountered by the projecting fracturing member on the impacting edge 5", the fracturing member impacts and shatters the heterogeneity, allowing continued engagement of the cutting teeth with the impacted surface. If the harder heterogeneity is not sufficiently shattered for the blade to make forward cutting progress on the first pass, the alternating impacting and cutting engagement of the reciprocating stroke of the saw against the surface of the material repeatedly strikes the said heterogeneity until it is thoroughly dispatched. The saw will then continue cutting in a typical forward fashion.

FIG. 3 depicts a fragmentary perspective of another embodiment of a saw blade similar to FIG. 1 but with a second projecting fracturing member 5 placed on the flat blade body 1 and separated by a predetermined number of cutting teeth 4. A second projecting fracturing member allows the saw to encounter and shatter more icy heterogeneities that may have been too distal or proximal for just one projecting fracturing member to reach. Moreover, depending on the location of the icy heterogeneity, it may allow the said heterogeneity to be impacted twice on a single stroke of the saw, thus reducing operator fatigue.

Figure 4:
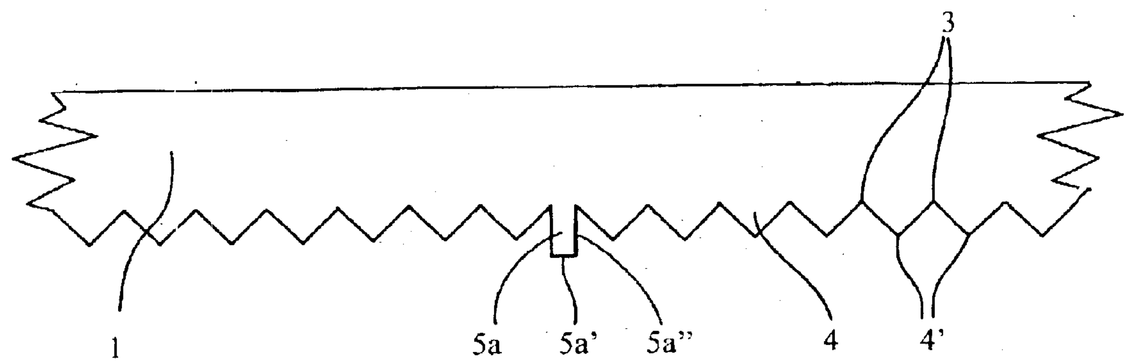
FIG. 4 is a fragmentary side elevation of a saw blade having an alternative fracturing member configuration.

FIG. 4 depicts a fragment of an elongated saw blade, which may be a reciprocal saw blade as has been discussed, or a continuous, elongate band saw blade, having another embodiment of a fracturing member **5*a* with an overall height of approximately 1.2 times the height of the adjacent cutting teeth 4**. A fracturing member any smaller than this is rendered mostly ineffective. Blade riding and skating over harder heterogeneities occurs and not enough material is dislodged to make it an advantageous feature.

Figure 5:
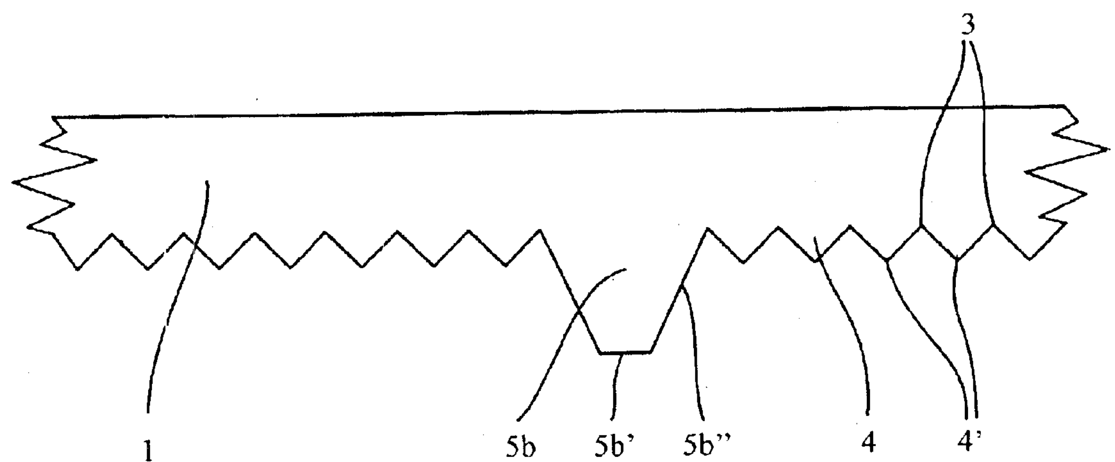
FIG. 5 is a fragmentary side elevation of a saw blade having yet another fracturing member configuration.

FIG. 5 depicts a fragment similar to FIG. 4 but illustrating a fracturing member **5*b* approximately 4 times the height of the adjacent cutting teeth 4. If the projecting fracturing member's height is any greater than this, it tends to: either jam on any heterogeneous layers and interfere with smooth blade operation and/or dislodge material faster than can be removed by the Cutting Teeth 4**.

Figure 6:
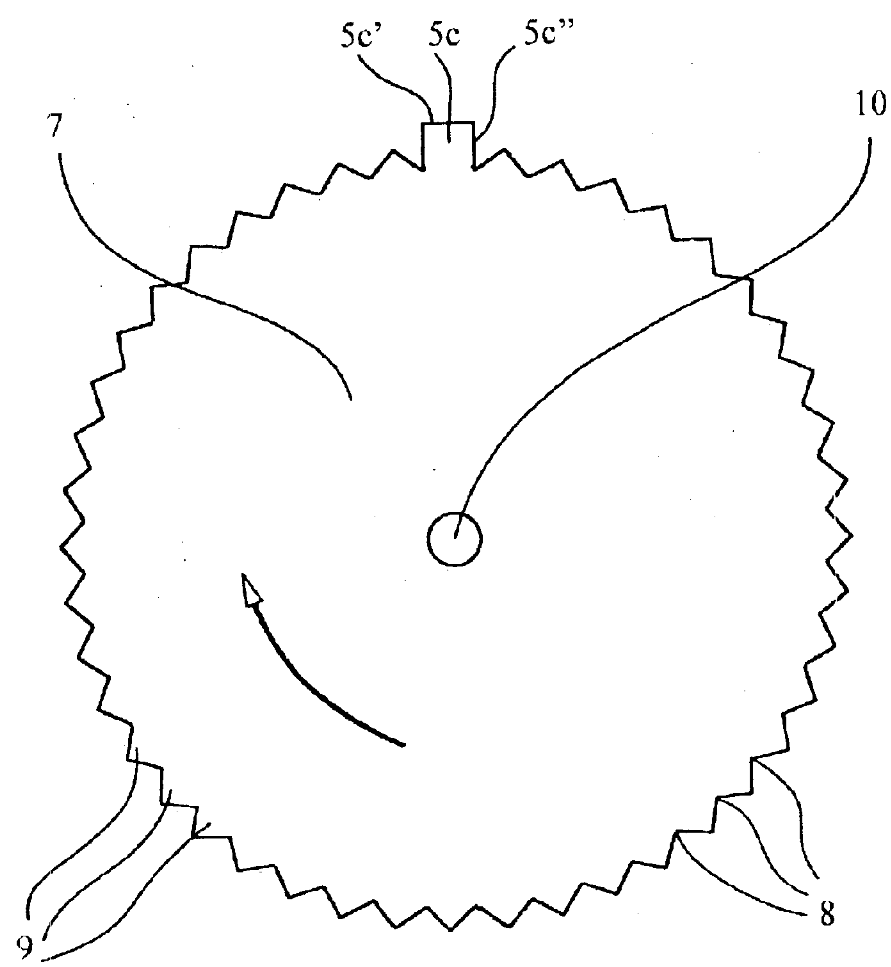
FIG. 6 is a plan view of a circular saw blade having a projecting fracturing member as described in this invention.

FIG. 6 illustrates a plan view of another embodiment of a saw blade of this invention wherein the flat blade body is configured as a circular saw blade 7 having a continuous, peripheral outer leading blade base edge 8 with cutting teeth 9 projecting outwardly therealong and interrupted by at least one projecting fracturing member **5*c*. The blade includes a blade-mounting arbor 10 for mounting the blade on the drive spindle (not shown) of a circular saw. In operation, the blade rotates at an adequate speed while cutting through the work piece and the impact surface 5*c*" of the projecting fracturing member 5*c* encounters and dispatches heterogeneities in advance of the cutting teeth 9**. The cutting teeth remove any shattered heterogeneities.

FIGS. **7*a–c*** illustrate additional alternative configuration of fracturing members that embody features of the present invention.

FIG. **7*a* depicts a robust chisel shaped member 5*d***.

FIG. **7*b* depicts an aggressive square fracturing member 5*e***.

FIG. **7*c* depicts a less impactual rounded fracturing member 5*f***.

It will be apparent to those skilled in the art that various changes, other than those already described, may be made in the size, shape, type, number and arrangement of parts described without departing from the spirit of my invention and the scope of the following claims.

Having described my invention and the manner in which it may be used, I claim:

1. A saw blade for cutting friable, heterogeneous material including the combination of snow and ice, the saw blade comprising:

a) A substantially flat blade body having a selected overall surface configuration with a predetermined cross sectional thickness dimension and defining an outer, leading blade base edge, b) A plurality of outwardly projecting, cutting saw teeth on and extending along said outer leading blade base edge and forming an extending line of projecting cutting saw teeth therealong, said cutting saw teeth having predetermined tooth configurations and tooth heights from said leading blade base edge selected for desired cutting characteristics and materials to be cut by the saw blade, c) an outwardly projecting fracturing member on said outer leading blade base edge disposed at a predetermined position therealong interrupting said extending line of cutting saw teeth, said fracturing tooth member configured with a non-cutting impact surface and having an overall height from said outer leading blade base edge between 1.2 and 4 times an overall tooth height of corresponding cutting saw teeth from said leading base edge and forming a raised, non-cutting impact surface projecting outwardly beyond the outermost line of said cutting saw teeth extending along the outer leading blade base edge of the blade body, and d) support means on the saw blade for releasable interengagment of the saw blade to a saw blade drive source for supporting and moving the saw blade relative to a material to be cut and for operative sawing interengagement of the saw blade with the material, e) whereby during sawing, cutting engagement of the cutting saw teeth against the material is momentarily interrupted by abutting, non-cutting, shattering impact contact of the projecting fracturing member against the material, effectively fracturing the material immediately prior to continued cutting engagement of the cutting saw teeth extending along said leading base edge against the impacted surface of the material.

2. The saw blade of claim 1 wherein said flat blade body is configured as a longitudinally elongated hand saw blade with said outer leading blade base edge extending along substantially the entire length of one longitudinal edge thereof between front and rear longitudinal ends of the blade body and said support means comprises a hand grip handle member on a rear longitudinal end of said flat blade body for hand-held support and sawing movement of the saw blade on a material to be cut.

3. The saw blade of claim 2 wherein said flat blade body and cutting tooth configurations are selected to form a snow saw blade for facilitated sawing of ice and snow.

4. The saw blade of claim 3 including a second, projecting fracturing member on said leading blade base edge disposed a spaced distance from said first fracturing member and separated therefrom by an extending line of cutting saw teeth.

5. The saw blade of claim 1 including a second, projecting fracturing member on said leading blade base edge disposed a spaced distance from said first fracturing member and separated therefrom by an extending line of cutting saw teeth.

6. The saw blade of claim 1 wherein said flat blade body is configured as a circular saw blade body and said outer leading base blade edge forms the outer circumferential edge of the blade body, and said support means comprises an arbor through the blade body at its diametric center point configured for releasable mounting interengagement with a rotating drive shaft of a circular saw.

* * * * *